United States Patent [19]

Rosenbaum et al.

[11] Patent Number: 5,323,461

[45] Date of Patent: Jun. 21, 1994

[54] TELEPHONE LINE INTERFACE CIRCUIT WITH VOLTAGE SWITCHING

[75] Inventors: Stanley D. Rosenbaum; Brian A. F. S. Sutherland, both of Ottawa; Reinhard W. Rosch, Richmond, all of Canada

[73] Assignee: Northern Telecom Limited, Montreal, Canada

[21] Appl. No.: 862,478

[22] Filed: Apr. 2, 1992

Related U.S. Application Data

[63] Continuation-in-part of Ser. No. 648,776, Jan. 31, 1991, Pat. No. 5,103,387.

[51] Int. Cl.$^5$ ............................................. H04M 19/00
[52] U.S. Cl. .................................... 379/399; 379/340; 379/400; 379/413; 379/324
[58] Field of Search ............... 379/252, 253, 254, 255, 379/324, 340, 399, 400, 401, 413; 363/21, 127

[56] References Cited

U.S. PATENT DOCUMENTS

| | | |
|---|---|---|
| 4,161,633 | 7/1979 | Treiber . |
| 4,315,106 | 2/1982 | Chea, Jr. ............................ 379/377 |
| 4,317,963 | 3/1982 | Chea, Jr. . |
| 4,355,209 | 10/1982 | Sabon . |
| 4,410,766 | 10/1983 | Beirne ............................ 179/16 F |
| 4,419,542 | 12/1983 | Embree et al. ............... 379/413 X |
| 4,431,868 | 2/1984 | Bolus et al. . |
| 4,431,869 | 2/1984 | Sweet ............................. 379/413 X |
| 4,764,956 | 8/1988 | Rosch et al. . |

FOREIGN PATENT DOCUMENTS

| | | |
|---|---|---|
| 237656A2 | 9/1987 | European Pat. Off. . |
| 425675A1 | 5/1991 | European Pat. Off. . |
| 604454 | 9/1978 | Switzerland . |
| 1489143 | 10/1977 | United Kingdom . |

OTHER PUBLICATIONS

"Service Adaptive Access" by Q. Chow and G. Mein, Telesis 1990 one/two, Jul. 1990, pp. 54–56.

Primary Examiner—James L. Dwyer
Assistant Examiner—Paul A. Fournier
Attorney, Agent, or Firm—R. John Haley

[57] ABSTRACT

A two-wire telephone line interface circuit comprises a driver circuit for supplying direct current on the line, a controlled voltage generator, a sensing circuit for monitoring the line current, a control circuit for controlling an output voltage of the voltage generator, and a switching circuit. The control circuit controls the switching circuit to supply, as a supply voltage for the driver circuit, a battery voltage in an on-hook state of the line or the controlled output voltage of the voltage generator in an off-hook state of the line, this output voltage being controlled to provide off-hook current limiting. The control circuit also controls the switching circuit to selectively supply the controlled output voltage of the voltage generator as a signalling voltage to at least one wire of the line for high voltage signalling, e.g. ringing, on the line. Desirable forms of the switching circuit are described.

23 Claims, 2 Drawing Sheets

TELEPHONE LINE INTERFACE CIRCUIT WITH VOLTAGE SWITCHING

This is a continuation-in-part of U.S. patent application Ser. No. 07/648,776 filed Jan. 31, 1991 in the names of S. D. Rosenbaum et al. and entitled "High Voltage Converter", resulting in U.S. Pat. No. 5,103,387 to issue on Apr. 7, 1992. The entire disclosure of this patent application is hereby incorporated herein by reference.

This invention relates to a line interface circuit for a telecommunications line, in particular a two-wire telephone subscriber line extending from a telephone central office or remote terminal to a subscriber's telephone.

BACKGROUND OF THE INVENTION

It is well known to provide a two-wire telephone line interface circuit in which the outputs of a line driver circuit are coupled to the tip and ring wires of a telephone line via a sensing circuit which is responsive to current on the wires. The sensing circuit enables the hook status of the subscriber's telephone to be determined by monitoring the loop or differential direct current on the wires, as well as providing a path for a.c. (e.g. voice) signals to the telephone central office (C.O.). In order to provide for ringing signals to be supplied to the line for activating a ringer of the subscriber's telephone, generally contacts of a ringing relay are provided on the output side of the line driver circuit, to connect the tip and ring wires to ground and to a ringing voltage generator respectively and to interrupt their connections to the line driver circuit outputs so that the line driver circuit is not exposed to the high ringing voltage.

In such an arrangement costs are reduced by sharing the ringing voltage generator among many line interface circuits, but as a consequence a ringing voltage generator may not always be immediately available for supplying a ringing signal to a line when desired, and the provision of different ringing signals (different frequencies or different ring signal sequences) is complicated. Similar arrangements may be provided for other forms of high voltage signalling, such as coin and message waiting signalling, with similar disadvantages.

In Bolus et al. U.S. Pat. No. 4,431,868 issued Feb. 14, 1984 and entitled "Solid State Telephone Line Interface Circuit With Ringing Capability" there is described a line interface circuit in which a low-level ringing reference signal can be supplied to the input side of the line driver circuit to be amplified thereby to produce the desired high voltage ringing signal at the outputs of the line driver circuit, and at the same time the supply voltage rails of the line driver circuit are controlled to follow (with an offset) the instantaneous values of the ringing signal waveform thereby to reduce power dissipation in the line driver circuit. In this arrangement a voltage generator for producing the line driver circuit supply voltages is controlled in dependence upon the voltages sensed at the outputs of the line driver circuit.

With evolution of line interface circuits, and especially with increasing numbers and types of service (e.g. ringing frequencies and sequences) being desired by and available to telephone subscribers, it is becoming increasingly necessary to provide equipment such as line interface circuits which can be used in a versatile manner to provide various features or services as these may be desired.

An object of this invention is to provide an improved line interface circuit.

SUMMARY OF THE INVENTION

According to one aspect of this invention there is provided an interface circuit for a two-wire telephone line, comprising: driver means for supplying direct current on the line; a controlled voltage generator; control means for controlling an output voltage of the voltage generator; and switching means controlled by the control means for deriving a supply voltage for the driver means selectively from either the controlled output voltage of the voltage generator or a source voltage.

Thus the supply voltage for the driver means can be constituted by either the source voltage, which is typically a C.O. battery voltage, or the controlled output voltage of the voltage generator. Power can be conserved in the former case, occurring most of the time while the telephone line is not in use (the on-hook state), by not activating the voltage generator, and in the latter case by controlling the output voltage of the voltage generator to limit off-hook current on the line.

Preferably the switching means is further controlled by the control means for selectively supplying the controlled output voltage of the voltage generator either as a signalling voltage to at least one wire of the line or as the supply voltage for the driver means. This enables the voltage generator to be used for both off-hook current limiting and supplying high voltage signals, such as ringing signals, to the line.

The switching means conveniently comprises first to sixth switches respectively for selectively connecting the source voltage to a supply voltage line of the driver means, the controlled output voltage to the supply voltage line of the driver means, a first output of the driver means to a first wire of the line, a second output of the driver means to a second wire of the line, the controlled output voltage to the first wire of the line, and the controlled output voltage to the second wire of the line. In preferred implementations, the third and fifth switches are constituted by first and second contacts of a first relay, the fourth and sixth switches are constituted by first and second contacts of a second relay, each relay has its second contact phased oppositely to the first contact and includes a third contact having the same phase as the first contact, and the third contacts of the two relays are connected in series with one another and together constitute the second switch.

The interface circuit preferably includes means for monitoring direct current on the line. Desirably the control means is arranged to control the output voltage of the voltage generator in dependence upon the monitored current when this output voltage is supplied as the supply voltage for the driver means, and is also arranged to control the switching means to supply the source voltage as the supply voltage for the driver means when the monitored current is below a predetermined threshold.

According to another aspect of this invention there is provided an interface circuit for a two-wire telephone line, comprising: driver means for supplying direct current on the line; a controlled voltage generator; control means for controlling an output voltage of the voltage generator; and switching means controlled by the control means for selectively supplying the controlled output voltage of the voltage generator either as a signalling voltage to at least one wire of the line or as the supply voltage for the driver means.

According to a further aspect, this invention provides an interface circuit for a telephone line, comprising driver means for supplying direct current on the line, generating means for generating a controlled voltage, and means for selectively supplying the controlled voltage either as a voltage on the line or as a supply voltage for the driver means.

The invention further provides an interface circuit for a telephone line, comprising driver means for supplying direct current on the line, generating means for generating a controlled voltage, and means for selectively supplying either the controlled voltage or a source voltage as a supply voltage for the driver means.

BRIEF DESCRIPTION OF THE DRAWINGS

The invention will be further understood from the following description with reference to the accompanying drawings, in which.

DETAILED DESCRIPTION

Figure 1:
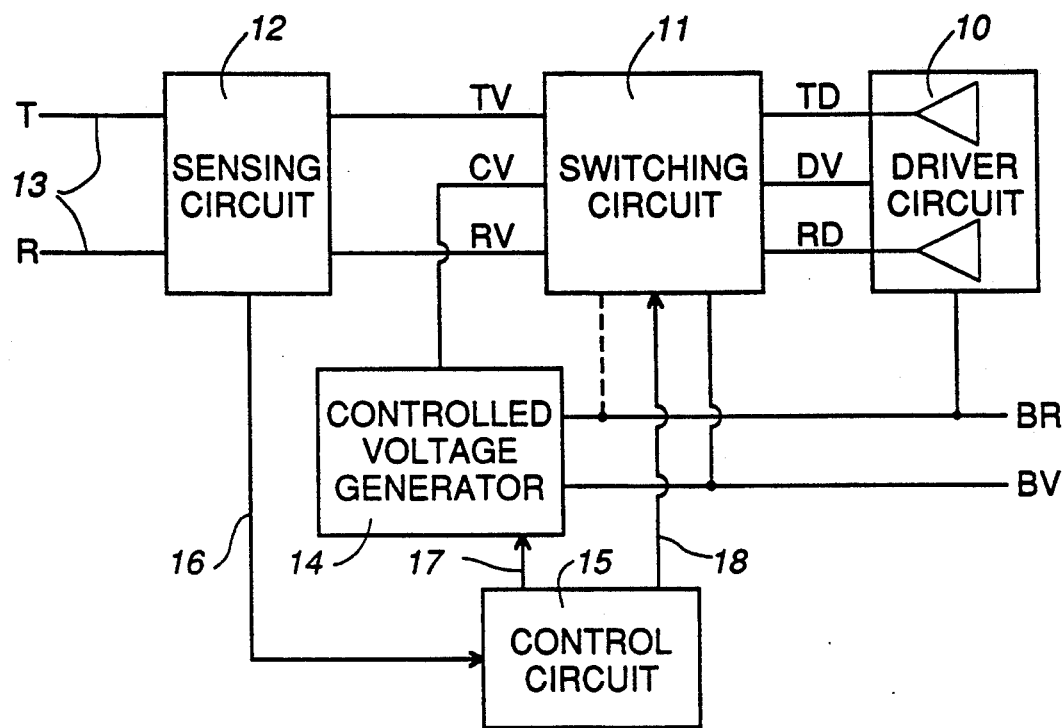
FIG. 1 is a block diagram illustrating a telephone line interface circuit in accordance with this invention.

Referring to FIG. 1, there is illustrated a block diagram of a two-wire telephone line interface circuit, which is typically part of a telephone central office or C.O. (not shown). The line interface circuit comprises a line driver circuit 10, a switching circuit 11 and a sensing circuit 12 via which outputs of the line driver circuit 10 are coupled to the tip wire T and the ring wire R of a two-wire telephone line 13, a controlled voltage generator 14, and a control circuit 15.

The line driver circuit 10 and the sensing circuit 12 can be of known form, for example as described in Rosch et al. U.S. Pat. No. 4,764,956 issued Aug. 16, 1988 and entitled "Active Impedance Line Feed Circuit". Although not shown in FIG. 1, receive path a.c. signals to be transmitted to the line 13 can be applied to an input of the line driver circuit 10, and transmit path a.c. signals can be derived from the line 13 via the sensing circuit 12, in known manner.

The sensing circuit 12 provides on paths represented by a line 16 to the control circuit 15 signals representing the (d.c.) loop current, which flows differentially in the tip and ring wires and is supplied by the line driver circuit 10 in known manner, and common mode current on the line 13. The control circuit 15 determines the sum and difference of these currents thereby to determine the currents on the tip and ring wires individually, monitors these currents and the loop current signal as described further below, and provides control signals for the controlled voltage generator 14 and the switching circuit 11 via control paths 17 and 18 respectively. Power for the controlled voltage generator 14 is supplied from a C.O. battery or other d.c. source via a battery voltage line BV (typically −48 volts) and a battery return line BR (ground or zero volts). The sensing circuit 12 and control circuit 15 are also supplied with power derived from the battery via connections which for clarity are not shown in FIG. 1.

The controlled voltage generator 14 is a four-quadrant pulse width modulated d.c. to d.c. converter which can provide on a controlled voltage output line CV a voltage which is controlled by the control circuit 15 via the control paths 17. This controlled voltage can for example include a.c. and d.c. components within a range from about −170 to about +180 volts peak, so that it can constitute various forms of high voltage signalling used in telephony, such as ringing, coin, and message waiting signalling. The controlled voltage generator (CVG) 14 can be enabled and disabled by the control circuit 15 as further described below, and preferably has a high output impedance when it is disabled or inactive. The CVG is conveniently of the form fully described in the parent application, but other forms of d.c. to d.c. converter may alternatively be used.

The battery voltage line BV and the controlled voltage line CV are connected to the switching circuit 11, which as described below can selectively connect either of these to a driver voltage line DV which constitutes a supply voltage line for the line driver circuit 10. The tip and ring drive outputs of the line driver circuit 10, lines TD and RD respectively, are also connected to the switching circuit 11 which can connect them selectively, as fully described below, to tip voltage and ring voltage lines TV and RV respectively, which in turn are coupled to the tip and ring wires T and R respectively via the sensing circuit 12 in known manner. The battery return line BR is optionally also connected to the switching circuit 11, as shown by a dashed line in FIG. 1.

Figure 2:
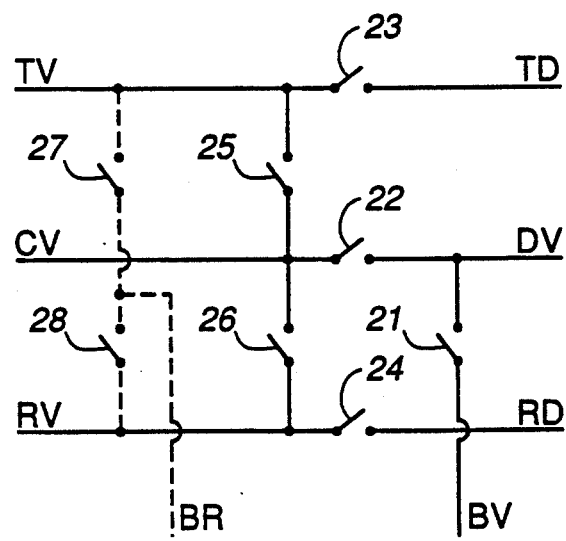
FIG. 2 illustrates a general form of a switching circuit of the line interface circuit of FIG. 1.

FIG. 2 illustrates a general form of the switching circuit 11, which comprises switches 21 to 28 which may be electro-mechanical switches, such as relay contacts, or solid state switches, or a combination of both. The switches 27 and 28, each having a connection to the battery return line BR which is only optionally connected to the switching circuit 11, may likewise optionally be omitted and accordingly their connections are shown in FIG. 2 by dashed lines. Each of the switches 21 to 28 is connected between two connection lines of the switching circuit 11, as follows:

| 21 between BV and DV | 22 between CV and DV |
| 23 between TD and TV | 24 between RD and RV |
| 25 between CV and TV | 26 between CV and RV |
| 27 between BR and TV | 28 between BR and RV. |

The control circuit 15 controls the states of the switches 21 to 28, and the active (enabled) or inactive (disabled) state of the CVG 14 as well as its output voltage when active as described above, to provide various telephone operating conditions or modes which are listed in Table 1 and are subsequently described in detail. It is observed that many other switch combinations are possible, but those in Table 1 represent a convenient subset of combinations for telephony operations. In Table 1, "C", "−", and "X" represent respectively closed, open, and "don't care" (i.e. open or closed) states of each switch, "A" and "I" in the column headed "CVG" represent respectively active and inactive states of the CVG 14, and the column headed "Application" indicates a typical telephony application for each respective operating mode:

TABLE 1

| Mode | 21 | 22 | 23 | 24 | 25 | 26 | 27 | 28 | CVG | Application |
|---|---|---|---|---|---|---|---|---|---|---|
| 1 | C | X | C | C | — | — | — | — | I | Idle or d.c. feed |
| 2 | — | C | C | C | — | — | — | — | A | Idle or d.c. feed |
| 3 | C | — | — | C | X | — | — | — | I | Ground start |
| 4 | C | — | — | C | C | — | — | — | A | Signalling on Tip |
| 5 | X | — | — | — | C | — | — | — | A | Coin signalling on Tip |
| 6 | C | — | C | — | — | C | — | — | A | Signalling on Ring |
| 7 | X | — | — | — | C | C | — | — | A | Simplex coin signalling |
| 8 | X | — | — | — | C | — | — | C | A | Signalling on Tip |
| 9 | X | — | — | — | — | C | C | — | A | Signalling on Ring |

It should be noted from Table 1 that in modes 5, 7, 8, and 9 the switch 22 is open and the switch 21 can be open; the line driver circuit 10 does not need to be powered in these modes of operation. When the CVG 14 is inactive, in modes 1 and 3, it is assumed to present a high impedance at its output so that the switch 22 in mode 1 and 25 in mode 3 can be open or closed; if the CVG does not provide a high output impedance when inactive these switches would have to be open in these modes.

In mode 1, the driver circuit 10 is supplied with the battery voltage and has its outputs connected to the tip and ring voltage lines to result in a conventional configuration, and the CVG is inactive. This mode is generally used for the normal on-hook state of the line 13, which occurs most of the time, and enables a minimum amount of power is used in this state.

In mode 2, the driver circuit 10 is supplied with the controlled voltage produced by the CVG 14 instead of the battery voltage; this mode is adopted in the off-hook state of the line 13. In mode 2, as described further below, the control circuit 15 monitors the loop current signal supplied by the sensing circuit 12 via the line 16 and uses this to determine the controlled voltage produced by the CVG 14, whereby a current limiting operation is achieved to limit the loop current to a relatively low off-hook level, for example of the order of 20 to 50 mA. Thus the controlled voltage which in this mode is used to power the driver circuit 10 is adaptively adjusted to accommodate different loop resistances arising from different lengths of the line 13, thereby avoiding undesirably high power consumption and dissipation which would otherwise arise due to high loop currents flowing on short lines. Mode 2 can also be used as described further below to compensate for a low battery voltage.

In mode 3, the driver circuit is powered from the battery voltage, and the switch 24 is closed to connect only the ring wire to its output, the tip wire being an open circuit, thereby providing a ground start operating mode.

In each of the other modes 4 to 9, the control circuit 15 controls the CVG 14 to generate a controlled voltage which, over time, has desired characteristics, for example constituting a ringing signal, a coin signal, a message waiting signal, or some other signal which may have a relatively high voltage. Although the term "signal" is used for clarity in this respect, it should be appreciated that the CVG 14 can be used in this manner to supply any desired voltage to either or both wires of the line, regardless of the specific purpose of such voltage. Other purposes could include line testing (e.g. insulation testing) and line conditioning (e.g. "zapping" noisy lines) functions.

In mode 4, the switch 25 is closed so that this signal is supplied from the controlled voltage line CV to the tip voltage line TV, and the switches 21 and 24 are closed so that the driver circuit 10 is powered from the battery to provide a signalling return path via the ring drive line RD and this circuit 10. Mode 8 is similar except that the switch 28 is closed, instead of the switch 24, to provide a direct return path via the battery return line BR. Each of these modes provides for signalling on the tip wire, with the ring wire grounded or at a potential determined at the output of the driver circuit 10 on the ring drive line RD. This potential may be determined to be anywhere between the supply voltages, e.g. −48 and zero volts, on the lines BV and BR respectively, depending on the d.c. conditions established for the driver circuit 10.

Conversely, modes 6 and 9 provide for signalling on the ring wire with the tip wire grounded (mode 9) or at a potential (mode 6) determined by the d.c. conditions of the driver circuit 10. Thus in both of these modes the switch 26 is closed to supply the controlled voltage from the line CV to the line RV. In mode 6 the switch 21 is closed so that the driver circuit 10 is supplied from the battery voltage line BV and the switch 23 is closed to connect the tip drive line TD to the tip voltage line TV; in mode 9 the switch 27 is closed to ground the tip voltage line TV. The controlled voltage on the line CV produced by the CVG under the control of the control circuit 15 in this case may constitute a ringing signal, of any desired frequency for frequency selective ringing and of any desired ring signal sequence (e.g. long and/or short rings). It may alternatively constitute a message waiting signal in the form of a 1 Hz pulse with a 50% duty cycle, or any other desired form of signal which may be of relatively high voltage.

In mode 5, the switch 25 is closed to connect the controlled voltage line CV to the tip voltage line TV to provide for coin signalling on the tip wire with the ring wire open. In mode 7 the switch 26 is also closed so that both of the lines TV and RV are connected to the line CV to provide for the same signalling voltage to be applied to both of the tip and ring wires, thereby providing for simplex coin signalling. In each of these modes the driver circuit 10 need not be supplied with power, as already indicated.

As has already been indicated, the d.c. conditions at the outputs of the driver circuit 10 can be controlled, by the control circuit 15, so that a desired potential is provided on the lines TD and RD. More particularly, in modes 4 and 6 an approximately ground or zero volts potential can be established on the lines RD and TD respectively, so that these modes include within their operating conditions modes 8 and 9 respectively. Accordingly, the switches 27 and 28 and the battery return line BR, shown in dashed lines in FIG. 2, need not be provided, thereby simplifying the switching circuit 11. Such simplification is desirable especially in view of cost and reliability considerations.

It has been determined that, if the CVG 14 has a high output impedance when it is inactive as discussed above, then the switches 22 to 26 can be constituted by the contacts of only two relays K1 and K2, arranged in either of two slightly different ways to provide any of the operating modes 1 to 7. These two arrangements are illustrated in FIGS. 3 and 4 respectively, each individual arrangement enabling six of the seven operating modes to be provided.

Figure 3:
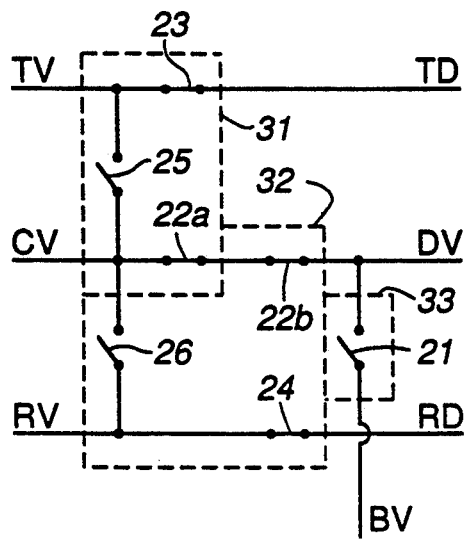
FIGS. 3 and 4 illustrate preferred forms of the switching circuit in two different embodiments of the invention.
Figure 4:
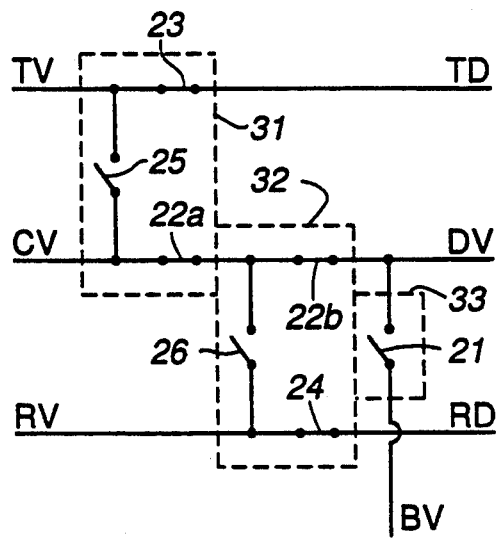

Referring to FIGS. 3 and 4, in each case the contacts of two latching relays K1 and K2 are represented within dashed line boxes 31 and 32. The switch 21, shown within a dashed line box 33, may conveniently comprise a solid state (semiconductor) switch. The switch 22 is effectively constituted by two series-connected relay contacts 22a and 22b, one for each of the relays and hence in each of the boxes 31 and 32. Within the box 31 the relay contacts of the relay K1 constitute the switches 22a, 23, and 25, and within the box 32 the relay contacts of the relay K2 constitute the switches 22b, 24, and 26. FIGS. 3 and 4 differ only in that the contact constituting the switch 26 is connected to the line CV directly in the arrangement of FIG. 3 and via the switch 22a in the arrangement of FIG. 4.

In FIGS. 3 and 4, the relay contacts of each relay are shown in what is referred to as a reset state of the relay; for the relay K1 and box 31 the switches 22a and 23 are closed and the switch 25 is open (i.e. is oppositely phased), and for the relay K2 and box 32 the switches 22b and 24 are closed and the switch 26 is open (i.e. is oppositely phased). In a set state of the relay K1 the switches 22a and 23 are open and the switch 25 is closed, and in a set state of the relay K2 the switches 22b and 24 are open and the switch 26 is closed. Non-latching relays may alternatively be used.

Figure 5:
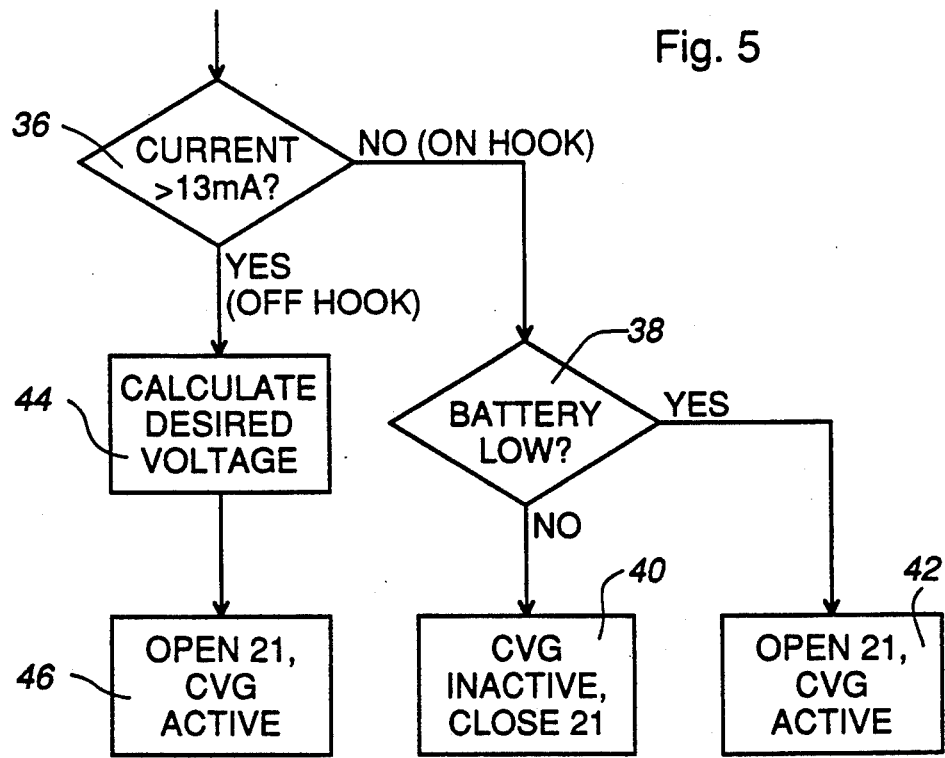
FIG. 5 is a flow chart illustrating operations of a control circuit of the line interface circuit of FIG. 1.

Table 2 below shows, for the arrangements of FIGS. 3 and 4 and for the operating modes 1 to 7 discussed above, the necessary states of the switch 21, the relays K1 and K2, and the CVG 14. In Table 2, "C" represents the closed state of the switch 21, "S" and "R" represent respectively the set and reset states of the relays K1 and K2, "—" represents the open state of the switch 21, "A" and "I" in the columns headed "CVG" represent respectively active and inactive states of the CVG 14, and the "Application" column is as in Table 1:

digital form for the control circuit 15. The control circuit can produce the desired instantaneous value of the voltage required of the CVG 14 as a digital output to the CVG on the paths 17, and can provide binary control signals for the switch 21 and the relays K1 and K2 on the paths 18. By way of example, FIG. 5 shows a flow chart in accordance with which the control circuit 15 may operate to select either the CVG 14 or the driver circuit 10 for controlling the CVG 14 and the switch 21 to supply DC feed to the line 13 in operating modes 1 and 2 as discussed above. In each of these modes the relays K1 and K2 are reset, as shown in Table 2.

Referring to FIG. 5, in a decision block 36 the control circuit 15 determines whether the loop current is greater than 13 mA, this being used as a decision for the hook status for the subscriber line 13. If the answer is no, it is concluded that the line 13 is idle and the subscriber's telephone is on-hook. In a further decision block 38 it is determined whether the C.O. battery voltage is low; if not as is normally the case a result block 40 is reached in which the control circuit 15 renders the CVG inactive and closes the switch 21 to use the battery for supplying the driver circuit 10 and hence the line 13. This produces operating mode 1, which is a low-power state which prevails most of the time.

If in the decision block 38 it is determined that the battery voltage is low (the control circuit 15 can monitor the C.O. battery voltage in any convenient manner), then a result block 42 is reached in which the control circuit 15 opens the switch 21 and activates the CVG to generate a fixed voltage, for example −49 volts, for supplying the driver circuit 10 and hence the line 13. This enables the line 13 to be supplied with a full d.c. feed voltage even when the C.O. battery voltage falls below this voltage, thereby prolonging desired operating conditions and improving reliability of operation. This corresponds to operating mode 2.

If in the decision block 36 it is determined that the loop current exceeds 13 mA, then it is concluded that the subscriber's telephone is off-hook. Depending upon the actual loop current which is monitored by the control circuit 15, as represented by a block 44 the control circuit calculates a desired output voltage of the CVG 14. This desired output voltage may be determined so

TABLE 2

| Mode | FIG. 3 | | | | FIG. 4 | | | | Application |
|---|---|---|---|---|---|---|---|---|---|
| | 21 | K1 | K2 | CVG | 21 | K1 | K2 | CVG | |
| 1 | C | R | R | I | C | R | R | I | Idle or d.c. feed |
| 2 | — | R | R | A | — | R | R | A | Idle or d.c. feed |
| 3 | C | S | R | I | C | S | R | I | Ground start |
| 4 | C | S | R | A | C | S | R | A | Signalling on Tip |
| 5 | Not Available | | | | C | S | S | A | Coin signalling on Tip |
| 6 | C | R | S | A | C | R | S | A | Signalling on Ring |
| 7 | C | S | S | A | Not Available | | | | Simplex coin signalling |

It can be appreciated from the above description that either of the arrangements of FIGS. 3 and 4 can be used to provide the vast majority of signalling functions which may be desired of a line interface circuit, using a minimal number of switching components and hence with relative economy and reliability.

Referring again to FIG. 1, it will be recalled that the control circuit is supplied via the line 16 with a signal representing the differential or loop current. The control circuit can conveniently be a digital control circuit or state machine, and a digital-to-analog converter may be provided to convert this signal on the line 16 into a that the loop current is maintained at a relatively low off-hook level, for example about 20 to 50 mA, thereby providing a loop current limiting function which enables power consumption and dissipation to be maintained at relatively low levels. In a subsequent result block 46 the control circuit 15 opens the switch 21 and activates the CVG to generate the desired voltage for supplying the driver circuit 10 and hence the line 13. This also corresponds to operating mode 2.

The steps represented by the flow chart of FIG. 5 are carried out in a repeated manner, along with other monitoring and control functions of the control circuit 15, so that there is a continuing adaptability and responsiveness of the control circuit to the prevailing conditions.

Although as described above the hook state of the line is used to determine, in the absence of signalling such as ringing, whether the battery or the CVG 14 is used to supply the driver circuit 10, a more complicated determination can be made in order to reduce, especially for long telephone lines, the overall power consumption of the line interface. Thus for example if the battery is able to supply a current of 20 mA to a long line in the off-hook state, then it may be more efficient to supply the driver circuit 10 from the battery voltage rather than from the CVG 14, because the latter necessarily operates at less than 100% efficiency. For shorter lines which in the off-hook state would conduct much higher currents if supplied with the battery voltage, it remains much more efficient to activate the CVG 14 for supplying a substantially lower supply voltage to the driver circuit 10.

It should also be noted that, as the sensing circuit 12 and the control circuit 15 provide for monitoring of the current on each of the tip and ring wires, the instantaneously monitored currents can also be used in a feedback loop for controlling the CVG 14 to reduce its output voltage and limit peak signalling currents so that they do not exceed desired values. This current limiting can act as a safety measure for example for message waiting signalling, and avoids high current flows on lines which may be excessively loaded with ringing equipment.

Although particular embodiments of the invention have been described in detail, it should be appreciated that numerous modifications, variations, and adaptations may be made without departing from the scope of the invention as defined in the claims.

What is claimed is:

1. An interface circuit for a telephone line, comprising driver means for supplying direct current on the line, generating means for generating a controlled voltage, and means for selectively supplying the controlled voltage either as a voltage on the line or as a supply voltage for the driver means.

2. An interface circuit as claimed in claim 1 and including means for monitoring direct current on the line.

3. An interface circuit as claimed in claim 2 and including means for controlling the controlled voltage generated by the generating means in dependence upon the monitored current when the controlled voltage is supplied as the supply voltage for the driver means.

4. An interface circuit as claimed in claim 2 and including means for supplying a source voltage as the supply voltage for the driver means when the monitored current is below a predetermined threshold.

5. An interface circuit as claimed in claim 2 and including means for selectively supplying either the controlled voltage or a source voltage as the supply voltage for the driver means in dependence upon whether the monitored current is respectively above or below a predetermined threshold, and means for controlling the controlled voltage generated by the generating means in dependence upon the monitored current when the controlled voltage is supplied as the supply voltage for the driver means.

6. An interface circuit as claimed in claim 1 and including means for selectively supplying a source voltage as the supply voltage for the driver means.

7. An interface circuit as claimed in claim 6 and including means for monitoring direct current on the line.

8. An interface circuit as claimed in claim 7 and including means for controlling the controlled voltage generated by the generating means in dependence upon the monitored current when the controlled voltage is supplied as the supply voltage for the driver means.

9. An interface circuit as claimed in claim 7 wherein the source voltage is supplied as the supply voltage for the driver means when the monitored current is below a predetermined threshold.

10. An interface circuit for a telephone line, comprising driver means for supplying direct current on the line, generating means for generating a controlled voltage, means for selectively supplying either the controlled voltage or a source voltage as a supply voltage for the driver means, means for monitoring direct current on the line, and means for controlling the controlled voltage generated by the generating means in dependence upon the monitored current when the controlled voltage is supplied as the supply voltage for the driver means.

11. An interface circuit as claimed in claim 10 wherein the source voltage is supplied as the supply voltage for the driver means when the monitored current is below a predetermined threshold.

12. An interface circuit for a two-wire telephone line, comprising:
    driver means for supplying direct current on the line;
    a controlled voltage generator;
    control means for controlling an output voltage of the voltage generator; and
    switching means controlled by the control means for deriving a supply voltage for the driver means selectively from either the controlled output voltage of the voltage generator or a source voltage.

13. An interface circuit as claimed in claim 12 wherein the switching means is further controlled by the control means for selectively supplying the controlled output voltage of the voltage generator either as a signalling voltage to at least one wire of the line or as the supply voltage for the driver means.

14. An interface circuit as claimed in claim 12 wherein the switching means comprises first to sixth switches respectively for selectively connecting the source voltage to a supply voltage line of the driver means, the controlled output voltage to the supply voltage line of the driver means, a first output of the driver means to a first wire of the line, a second output of the driver means to a second wire of the line, the controlled output voltage to the first wire of the line, and the controlled output voltage to the second wire of the line.

15. An interface circuit as claimed in claim 14 wherein the third and fifth switches are constituted by first and second contacts of a first relay, the fourth and sixth switches are constituted by first and second contacts of a second relay, each relay has its second contact phased oppositely to the first contact and includes a third contact having the same phase as the first contact, and the third contacts of the two relays are connected in series with one another and together constitute the second switch.

16. An interface circuit as claimed in claim 12 and including means for monitoring direct current on the line, the control means being responsive to the monitored current.

17. An interface circuit as claimed in claim 16 wherein the control means is arranged to control the output voltage of the voltage generator in dependence upon the monitored current when this output voltage is supplied as the supply voltage for the driver means.

18. An interface circuit as claimed in claim 16 wherein the control means is arranged to control the switching means to supply the source voltage as the supply voltage for the driver means when the monitored current is below a predetermined threshold.

19. An interface circuit as claimed in claim 16 wherein the control means is arranged to control the switching means to selectively supply either the controlled voltage or the source voltage as the supply voltage for the driver means in dependence upon whether the monitored current is respectively above or below a predetermined threshold, and to control the output voltage of the voltage generator in dependence upon the monitored current when this output voltage is supplied as the supply voltage for the driver means.

20. An interface circuit for a two-wire telephone line, comprising:
    driver means for supplying direct current on the line;
    a controlled voltage generator;
    control means for controlling an output voltage of the voltage generator; and
    switching means controlled by the control means for selectively supplying the controlled output voltage of the voltage generator either as a signalling voltage to at least one wire of the line or as the supply voltage for the driver means.

21. A telephone line interface circuit comprising a line drive circuit, a controlled voltage generator, switches for coupling the controlled voltage generator selectively to a telephone line or to the line drive circuit to provide a supply voltage thereto, and a control circuit for controlling the switches and the controlled voltage generator.

22. A telephone line interface circuit comprising a line drive circuit, a controlled voltage generator, a voltage source, at least one switch for deriving a supply voltage for the line drive circuit selectively from either the controlled voltage generator or the voltage source, and a control circuit for controlling the switch and the controlled voltage generator.

23. A telephone line interface circuit comprising:
    a line drive circuit;
    a control circuit;
    a controlled voltage generator for producing a voltage controlled by the control circuit;
    a voltage source; and
    switches controlled by the control circuit for selectively coupling:
        a telephone line to either the line drive circuit or the controlled voltage generator; and either the controlled voltage generator or the voltage source to the line drive circuit to provide a supply voltage thereto.

* * * * *